(12) United States Patent
Ouyang et al.

(10) Patent No.: US 7,729,438 B2
(45) Date of Patent: Jun. 1, 2010

(54) INTERLEAVER DESIGN FOR IEEE 802.11N STANDARD

(75) Inventors: Xuemei Ouyang, San Jose, CA (US); Huaning Niu, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 801 days.

(21) Appl. No.: 11/292,851

(22) Filed: Dec. 1, 2005

(65) Prior Publication Data

US 2007/0127587 A1 Jun. 7, 2007

(51) Int. Cl.
*H04B 7/02* (2006.01)
*H04L 1/02* (2006.01)

(52) U.S. Cl. .................. 375/267; 455/132; 455/133; 455/134; 455/135; 455/136

(58) Field of Classification Search .................. 375/260, 375/267
See application file for complete search history.

(56) References Cited

U.S. PATENT DOCUMENTS

| 4,394,642 | A | 7/1983 | Currie et al. | |
|---|---|---|---|---|
| 5,745,528 | A | 4/1998 | Fimoff et al. | |
| 5,987,070 | A | 11/1999 | Fimoff et al. | |
| 6,775,335 | B2 | 8/2004 | Sommer et al. | |
| 7,397,862 | B2 | 7/2008 | Ouyang et al. | |
| 2002/0131516 | A1 | 9/2002 | El-Gamal et al. | |
| 2003/0043928 | A1* | 3/2003 | Ling et al. | 375/267 |
| 2003/0074625 | A1* | 4/2003 | Adar et al. | 714/752 |
| 2003/0103584 | A1* | 6/2003 | Bjerke et al. | 375/340 |
| 2004/0047424 | A1* | 3/2004 | Ramaswamy et al. | 375/240.27 |
| 2004/0059981 | A1 | 3/2004 | Cucchi et al. | |
| 2005/0028065 | A1* | 2/2005 | Halter | 714/755 |
| 2005/0078764 | A1 | 4/2005 | Gresset | |
| 2005/0220110 | A1 | 10/2005 | Agarwal | |
| 2005/0256821 | A1 | 11/2005 | Mishra et al. | |
| 2005/0265469 | A1 | 12/2005 | Aldana et al. | |
| 2005/0283705 | A1 | 12/2005 | McNamara | |
| 2006/0002486 | A1* | 1/2006 | van Nee | 375/260 |
| 2006/0013330 | A1 | 1/2006 | Ha | |
| 2006/0036924 | A1* | 2/2006 | Ghosh | 714/755 |
| 2006/0088114 | A1 | 4/2006 | Chen et al. | |
| 2006/0088115 | A1 | 4/2006 | Chen et al. | |
| 2006/0090120 | A1* | 4/2006 | Chen | 714/790 |

(Continued)

OTHER PUBLICATIONS

U.S. Notice of Allowance for U.S. Appl. No. 11/104,808 mailed on Jul. 6, 2009.

(Continued)

*Primary Examiner*—Shuwang Liu
*Assistant Examiner*—Gina McKie
(74) *Attorney, Agent, or Firm*—Kenneth L. Sherman, Esq.; Michael Zarrabian, Esq.; Myers Andras Sherman LLP

(57) ABSTRACT

A MIMO wireless system includes a transmitter having a parser that parses a bit stream into multiple spatial data streams and multiple interleavers corresponding to the multiple spatial data streams, where each interleaver interleaves the bits in the corresponding spatial data stream by performing multiple column rotations and row rotation, to increase diversity of the wireless system. The MIMO wireless system also includes a receiver that has deinterleavers that deinterleaves spatial bit streams transmitted by the transmitter.

27 Claims, 10 Drawing Sheets

U.S. PATENT DOCUMENTS

| | | |
|---|---|---|
| 2006/0093059 A1 | 5/2006 | Skraparlis |
| 2006/0107171 A1 | 5/2006 | Skraparlis |
| 2006/0120311 A1* | 6/2006 | Berkovich ................. 370/310 |
| 2006/0120469 A1 | 6/2006 | Maltsev et al. |
| 2006/0187815 A1 | 8/2006 | Wallace et al. |
| 2006/0227892 A1 | 10/2006 | Ouyang et al. |
| 2006/0274687 A1* | 12/2006 | Kim ........................... 370/328 |
| 2007/0067696 A1 | 3/2007 | Bhatt et al. |
| 2007/0086538 A1* | 4/2007 | Ouyang et al. .............. 375/267 |
| 2007/0110178 A1 | 5/2007 | Su et al. |
| 2007/0127587 A1 | 6/2007 | Ouyang et al. |
| 2007/0140100 A1* | 6/2007 | Ouyang et al. .............. 370/203 |
| 2007/0140103 A1* | 6/2007 | Ouyang et al. .............. 370/208 |
| 2007/0140364 A1* | 6/2007 | Ouyang et al. .............. 375/260 |
| 2007/0147521 A1* | 6/2007 | Horng et al. ................. 375/260 |

OTHER PUBLICATIONS

U.S. Notice of Allowance for U.S. Appl. No. 11/314,929 mailed on Oct. 8, 2009.
U.S. Office Action for U.S. Appl. No. 11/314,925 mailed on Sep. 14, 2009.
U.S. Office Action for U.S. Appl. No. 11/317,409 mailed on Aug. 11, 2009.
S.A. Mujtaba, "TGn Sync Proposal Technical Specification," doc.: IEEE 802.11-04/889r0, Aug. 2004, pp. 1-135.
M.K. Abdul Aziz and A.R. Nix, "A Study of Performance and Complexity for IEEE 802.11n MIMO-OFDM GIS Solutions," IEEE Communications Society, International Conference, New York, 2004, vol. 7, pp. 3822-3826.
S.A. Mujtaba, "TGn Sync Proposal Technical Specification," doc.: IEEE 802.11-04/0889r2, Jan. 2005, pp. 1-152.
Singh, et al., "WWiSE Proposal: High throughput extension to the 802.11 Standard," doc.: IEEE 802.11-04/0886r4, Nov. 2004, pp. 1-80.
Kose, et al., "WWiSE Proposal: High throughput extension to the 802.11 Standard," doc.: IEEE 802.11-05/0149r2, Mar. 2005, pp. 1-93.
S.A. Mujtaba, "TGn Sync Proposal Technical Specification," doc.: IEEE 802.11-04/0889r7, Jul. 2005, pp. 1-133.
Naguib, et al., "Inceasing Date Rate Over Wireless Channels," Signal Processing Magazine, IEEE, May 2000, pp. 76-92.
S.A. Mujtaba, "TGn Sync Proposal Technical Specification," doc.: IEEE 802.11-04/0889r4, Mar. 2005, pp. 1-162.
International Search Report for International Application No. PCT/KR2006/005555 from Korean Intellectual Property Office dated Mar. 20, 2007, 3 pgs.
Written Opinion of the International Search Authority for International Application No. PCT/KR2006/005555 from Korean Intellectual Property Office dated Mar. 20, 2007, 4 pgs.
International Search Report for International Application No. PCT/KR2006/005133 from Korean Intellectual Property Office dated Feb. 26, 2007, 3 pgs.
Written Opinion of the International Searching Authority for International Application No. PCT/KR2006/005133 from Korean Intellectual Property Office dated Feb. 26, 2007, 3 pgs.
U.S. Non-Final Office Action for U.S. Appl. No. 11/104,808 mailed on Jan. 24, 2008.
U.S. Non-Final Office Action for U.S. Appl. No. 11/104,808 mailed on Jul. 21, 2008.
U.S. Final Office Action for U.S. Appl. No. 11/104,808 mailed on Jan. 6, 2009.
U.S. Advisory Action for U.S. Appl. No. 11/104,808 mailed on Apr. 6, 2009.
U.S. Non-Final Office Action for U.S. Appl. No. 11/314,929 mailed on Oct. 10, 2008.
U.S. Final Office Action for U.S. Appl. No. 11/314,929 mailed on Apr. 3, 2009.
U.S. Notice of Allowance for U.S. Appl. No. 11/253,855 mailed on Mar. 4, 2008.
U.S. Non-Final Office Action for U.S. Appl. No. 11/317,409 mailed on Nov. 13, 2008.
U.S. Final Office Action for U.S. Appl. No. 11/317,409 mailed on May 1, 2009.
U.S. Non-Final Office Action for U.S. Appl. No. 11/314,925 mailed on Oct. 15, 2008.
U.S. Final Office Action for U.S. Appl. No. 11/314,925 mailed on Apr. 13, 2009.
U.S. Appl. No. 11/104,808, filed Apr. 12, 2005, X. Ouyang et al.
S.A. Mujtaba, "TGn Sync Proposal Technical Specification," a contribution to IEEE 802.11-04-889r1, Nov. 2004, pp. 1-143.

* cited by examiner

INTERLEAVER DESIGN FOR IEEE 802.11N STANDARD

FIELD OF THE INVENTION

The present invention relates generally to data communication, and more particularly, to data communication with transmission diversity using Orthogonal Frequency Division Multiplexing (OFDM) in multiple antenna channels.

BACKGROUND OF THE INVENTION

In wireless communication systems, antenna diversity plays an important role in increasing the system link robustness. OFDM is used as a modulation technique for transmitting digital data using radio frequency signals (RF). In OFDM, a radio signal is divided into multiple sub-signals that are transmitted simultaneously at different frequencies to a receiver. Each sub-signal travels within its own unique frequency range (sub-channel), which is modulated by the data. OFDM distributes the data over multiple channels, spaced apart at different frequencies.

OFDM modulation is typically performed using a transform such as Fast Fourier Transform (FFT) process wherein bits of data are encoded in the frequency-domain onto sub-channels. As such, in the transmitter, an Inverse FFT (IFFT) is performed on the set of frequency channels to generate a time-domain OFDM symbol for transmission over a communication channel. The IFFT process converts the frequency-domain data for each sub-channel into a block of time-domain samples, which are converted to an analogue modulating signal later on for an RF modulator. In the receiver, the OFDM signals are processed by performing an FFT process on each OFDM symbol to convert the time-domain data into frequency-domain data, and the data is then decoded by examining the phase and amplitude of the sub-channels. Therefore, at the receiver the reverse process of the transmitter is implemented. Further, transmit antenna diversity schemes are used to improve the OFDM system reliability. Such transmission diversity schemes in OFDM systems are encoded in the frequency-domain as described.

OFDM has been selected as the basis for the high speed wireless local area network (WLAN) standards by the IEEE 802.11a standardization group, and is also being considered as the basis for the high throughput WLAN 802.11n standard. A typical transmitter for a conventional OFDM Multiple Input Multiple Output (MIMO) system implementing WLAN 802.11n comprises a channel encoder, a puncturer, a spatial parser, and multiple data stream processing paths. An example system is described in S. A. Mujtaba, "TGn Sync Proposal Technical Specification," a contribution to IEEE 802.11 11-04-889r1, November 2004 (incorporated herein by reference). Each data stream processing path comprises an interleaver, a bit-to-symbol constellation mapper, an IFFT function, and guard interval (GI) insertion window and an RF modulator.

For parser and interleaver portion of the system, forward error correction (FEC) coded and punctured bits are interleaved across spatial streams and frequency tones. There are two steps to the space-frequency interleaving: spatial stream parsing and frequency interleaving. First, encoded and punctured bits are parsed to multiple spatial streams by a round-robin parser. The parser sends consecutive blocks of bits to different spatial streams in a round-robin fashion starting with the first spatial stream. Second, all encoded bits are interleaved by a separate block interleaver for each spatial stream, with a block size corresponding to the number of bits in a single OFDM symbol. The block interleavers are based on the 802.11a interleaver, with certain modifications to allow for multiple spatial streams and 40 MHz transmissions.

The interleaver is defined by a two-step permutation. The first permutation ensures that adjacent coded bits are mapped onto nonadjacent subcarriers. The second permutation ensures that coded bits are mapped alternately onto less and more significant bits of the constellation and thereby long runs of low reliability (LSB) bits are avoided. A deinterleaver in a receiver performs the inverse operation, and is also defined by two permutations corresponding to the two interleaver permutations.

Such conventional system provides write in block, one column rotation for multiple antennas transmission, and PAM order rotation within a column. However, because the columns are rotated by only one column, adjacent bits are only 3 and 6 sub-carriers apart for 20 MHz and 40 MHz systems, respectively. As a result, in a correlated channel, the diversity gain is not fully utilized.

Another conventional transmitter design includes a channel encoder, a puncturer, a frequency interleaver, a spatial parser, and two data stream processing paths. Each data stream processing path comprises a bit to symbol constellation mapper, an IFFT function, guard interval insertion window and an RF modulator. The interleaver performs interleaving on two consecutive OFDM symbols before they are parsed onto two different antennas. The relation for the first permutation is:

$$i = N_{row} \times (k \bmod N_{column}) + \text{floor}(k/N_{column})$$

where Ncolumn=32, Nrow=$2N_{CBPS}$/Ncolumn

After the interleaving, the spatial parser parses the interleaved bits in group by a round robin fashion to different spatial streams. The group size equals to the number of bits in one Quadrature Amplitude Modulation (QAM) symbol. For example, for 64 QAM, 6 bits will be parsed into one spatial stream and the next 6 bits will be parsed into another spatial stream. However, such a transmitter is not flexible enough to accommodate different channel coding and modulation schemes on different special streams.

BRIEF SUMMARY OF THE INVENTION

In one embodiment, the present invention provides an interleaver design for a transmitter to be both flexible enough to accommodate different channel coding and modulation schemes on different special streams and allow exploring larger space frequency diversity gain.

As such, an example MIMO wireless system according to the present invention includes a transmitter having a parser that parses a bit stream into multiple spatial data streams and multiple interleavers corresponding to the multiple spatial data streams, where each interleaver interleaves the bits in the corresponding spatial data stream by performing multiple column rotations and at least one row rotation, to increase diversity of the wireless system. The MIMO wireless system also includes a receiver that has deinterleavers that deinterleaves spatial bit streams transmitted by the transmitter.

These and other features, aspects and advantages of the present invention will become understood with reference to the following description, appended claims and accompanying figures.

DETAILED DESCRIPTION OF THE INVENTION

In one embodiment, the present invention provides a method of bit stream interleaving for a MIMO system. The interleaving method increases the column rotation to the largest possible distance within a block to fully explore the diversity of the wireless system.

Figure 1A:
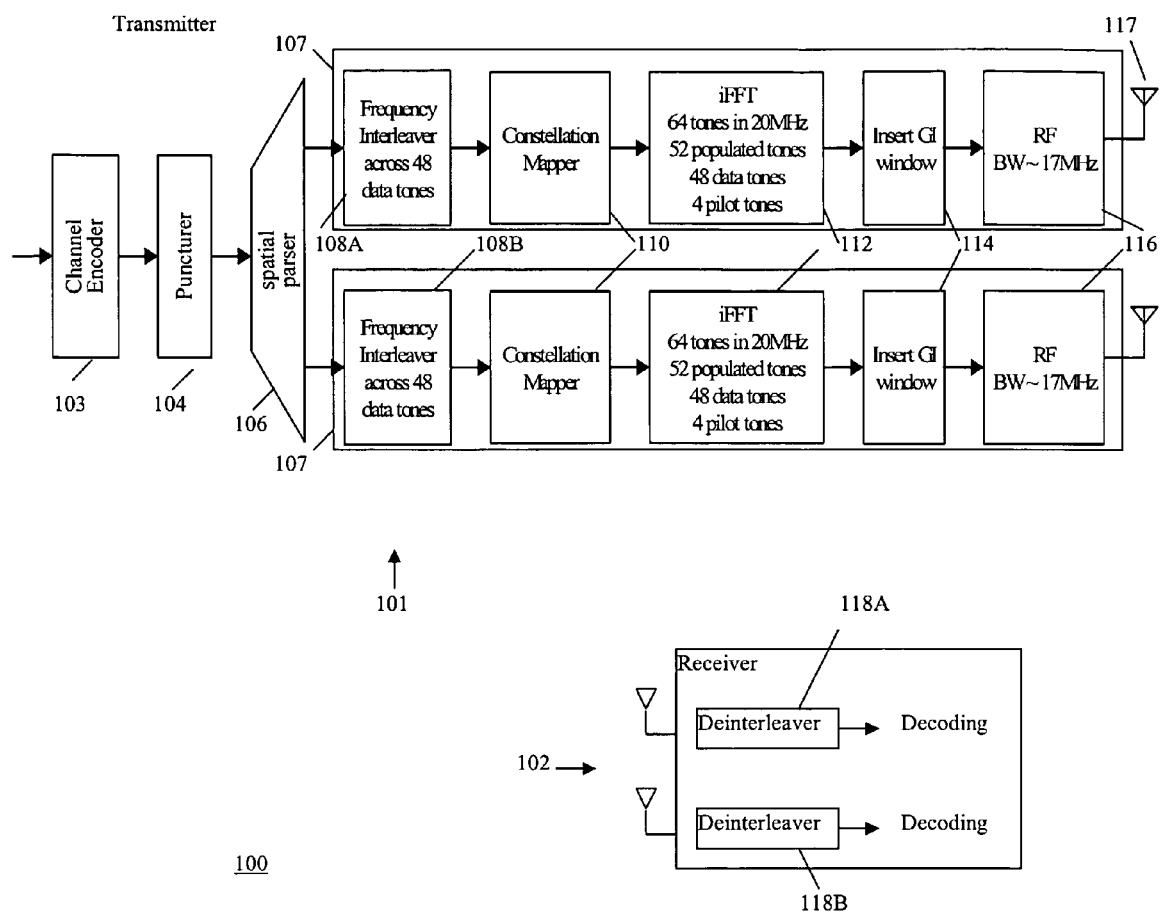
FIG. 1A shows a functional block diagram of an embodiment of an OFDM MIMO transmitter having a transmitter data path for 2-antenna MIMO in a 20 MHz channel, according to the present invention.

FIG. 1A shows an example block diagram of an OFDM MIMO system 100 (e.g., 20 MHz channel) implementing WLAN 802.11n, according to an embodiment of the present invention. The system 100 includes a transmitter 101 and a receiver 102. The transmitter 101 comprises a channel encoder 103, a puncturer 104, a spatial parser 106, and two data stream processing paths 107. Each data stream processing path 107 comprises an interleaver (e.g., interleaver 108A for a first processing path, and interleaver 108B for a second processing path), a constellation mapper 110, an IFFT function 112, and guard interval insertion window 114 and an RF modulator 116. For the parser 106 and the interleavers 108A, 108B portions of the transmitter, coded and punctured bits are interleaved across spatial streams and frequency tones. There are two steps to the space-frequency interleaving: spatial stream parsing and frequency interleaving.

Conventionally, encoded and punctured bits are parsed to multiple spatial streams by a round-robin parser where $$s = \max\{N_{BPSC}/2, 1\} \quad (1)$$

such that s is the number of bits parsed onto one antenna each round, and $N_{BPSC}$ is the number of coded bits per subcarrier. A conventional parser sends consecutive blocks of s bits to different spatial streams in a round-robin fashion starting with the first spatial stream. All encoded bits are conventionally interleaved by a separate block interleaver for each spatial stream, with a block size corresponding to the number of bits in a single OFDM symbol, $N_{CBPS}$. The conventional block interleavers are based on the 802.11a interleaver, with certain modifications to allow for multiple spatial streams and 40 MHz transmissions.

The basic interleaver array has $N_{row}$ rows and $N_{column}$ columns and $N_{BPSC}$ is the number of coded bits per subcarrier (e.g. $N_{BPSC}=1$ for BPSK, 2 for QPSK, 4 for 16 QAM, etc), wherein the interleaver parameters are shown in Table 1 below.

TABLE 1

| | Interleaver Parameters | |
|---|---|---|
| | $N_{column}$ | $N_{row}$ |
| 20 MHz channels | 16 | 3 $N_{BPSC}$ |
| 40 MHz channels | 18 | 6 $N_{BPSC}$ |

A conventional interleaver is defined by a two-step permutation. The first-step permutation (first permutation) ensures that adjacent coded bits are mapped onto nonadjacent subcarriers. The first permutation is modified from the 802.11a interleaver such that the column indexes in the array are rotated by one column for each spatial stream. The second-step permutation (second permutation) ensures that coded bits are mapped alternately onto less and more significant bits of the constellation and thereby long runs of low reliability (LSB) bits are avoided.

Relations (2) and (3) below define a conventional interleaver, wherein the index of the coded bit before the first permutation is denoted by k, and i is the index after the first and before the second permutation. In the conventional interleaver, the first permutation is defined by relation (2) below:

$$i = N_{row} \times (((k \bmod N_{column}) + i_{SS}) \bmod N_{column}) + \text{floor}(k/N_{column}), \quad (2)$$

$k=0, 1, \ldots, N_{CBPS}-1$, where $i_{SS}=0, 1, \ldots, N_{SS}-1$, is the index of the spatial stream on which this interleaver is operating. The insertion of $i_{SS}$ is a modification of the 802.11a interleaver. This results in a "column offset" in the interleaving process. That is, bits are read in by rows and out by columns, but starting with column $i_{SS}$ in a column-cyclic fashion.

Further, conventionally the second permutation is defined by relation (3) below, wherein j is the index after the second permutation, just prior to modulation mapping:

$$j = s \times \text{floor}(i/s) + (i + N_{CBPS} - \text{floor}(N_{column} \times i/N_{CBPS})) \bmod s, \quad (3)$$

$i=0, 1, \ldots, N_{CBPS}-1$, where s is determined according to relation (4) below:

$$s = \max(N_{BPSC}/2, 1). \quad (4)$$

Similarly, a deinterleaver in a receiver performs the inverse relation, and is defined by a first-step permutation and a second-step permutation corresponding to the conventional interleaver permutations above. Relations (5) and (6) define these first and second permutations for a conventional deinterleaver, wherein the index of the original received bit before the first permutation is denoted by j, and i is the index after the first and before the second permutation.

Conventionally, the first permutation in the deinterleaver is defined by relation (5) below:

$$i = s \times \text{floor}(j/s) + (j + \text{floor}(N_{column} \times j/N_{CBPS})) \mod s, \quad (5)$$

$j = 0, 1, \ldots, N_{CBPS}-1$, where s is as defined in relation (4) above. The first permutation in relation (5) is the inverse of the first permutation in relation (3) above.

Conventionally, the second permutation in the deinterleaver is defined by relation (6) below, where k is the index after the second permutation:

$$k = N_{column}(i \mod N_{row}) + (\text{floor}(i/N_{row}) - i_{ss} + N_{column}) \mod N_{column}, \quad (6)$$

$i = 0, 1, \ldots, N_{CBPS}-1$

The second permutation in relation (6) is the inverse of the interleaver permutation in relation (2) above.

As noted, the conventional system provides write in block, column rotation for multiple antennas transmission, and PAM order rotation within a column. However, because the columns are rotated by only one column, adjacent bits are only e.g. 3 and 6 sub-carriers apart for 20 MHz and 40 MHz systems. As a result, in a correlated channel, the diversity gain is not fully utilized.

In the commonly assigned patent application Ser. No. 11/104,808, filed on Apr. 12, 2005, an improved interleaving process is described which increases the column rotation to the largest possible distance within a block to fully explore the diversity of the wireless system. In such improved interleaving process, in a first permutation, the column rotation is changed from one column rotation to $((N_{column}/N_{ss}) \times i_{ss})$ column rotations, where $N_{ss}$ is the total number of spatial data streams and $i_{ss}$ is the index of spatial data stream which ranges from e.g. 0 to $N_{ss}-1$. As such, in contrast to the conventional interleaving relation (2) above, the first permutation in the improved interleaving process is defined by relation (7) below:

$$i = N_{row} \times (((k \mod N_{column}) + \text{floor}(N_{column}/N_{ss}) \times i_{SS}) \mod N_{column}) + \text{floor}(k/N_{column}) \quad (7)$$

where $k = 0, 1, \ldots, N_{CBPS}-1$.

On the receiver side, a deinterleaving process performs the reverse operation for de-interleaving the received bits. In contrast to the conventional deinterleaving relation (6) above, the second permutation in the deinterleaver is defined by relation (8) below:

$$k = N_{column} \times (i \mod N_{row}) + (\text{floor}(i/N_{row}) - \text{floor}(N_{column}/N_{ss}) \times i_{ss} + N_{column}) \mod N_{column} \quad (8)$$

wherein $i = 0, 1, \ldots, N_{CBPS}-1$.

In this description Ncol, $N_{col}$, Ncolumn and $N_{column}$ represent the same value. Further, Nrow and $N_{row}$ represent the same value. NBPSC and $N_{BPSC}$ represent the same value, and so on.

For example, if two data streams are to be transmitted, using the improved interleaving process, the adjacent data bits are separated 8 columns apart for different data streams in a 20 MHz channel. In another example, the adjacent data bits are separated 9 columns apart for different data streams in a 40 MHz channel.

In one example transmitter where there are multiple spatial streams, a block of bits in a first data stream is transmitted without any rotation in that block. Conventionally, each remaining spatial stream is transmitted after $i_{ss}$ column rotation relative to the first spatial stream. However, using the improved interleaving process, each remaining spatial stream is transmitted after multiple column rotations, wherein the number of rotations is the number of columns in the interleaver array divided by the number of spatial streams.

In another example transmitter where there are two spatial streams, and one spatial stream is transmitted over a first antenna, and the other over a second antenna, a first block of bits is transmitted over the first antenna without any rotation in that block. Conventionally, for the second antenna, data is transmitted with one column rotation where the second column is rotated to the first column, and so on, so that all the columns are shifted/rotated left by one column. Using the improved, however, for the second antenna, the number of rotations is the number of columns in the interleaver array divided by the number of antennas. For example, for a 20 MHz transmitter having two antennas, the interleaver array comprises 16 columns and three rows of bits. Using the improved interleavers, for the second antenna the number of rotations is the number of columns (16) divided by the number of antennas (2), resulting in 8 column rotations. As such, columns 9 through 16 are shifted into the first part (first 8 columns) of the array block, and columns 1 through 8 are shifted into the second part (second 8 columns) of the array block for transmission.

The MIMO system performance (e.g., throughput) using multiple column rotation interleaving in the improved interleavers is improved in comparison to a conventional system with one column rotation interleaving. This is because in OFDM different subcarriers are used and when bits are rotated by multiple columns, adjacent bits are separated further in the spatial domain and in the frequency space, reducing fading in transmission channels.

Using multiple column rotation according to the improved interleaving process, two adjacent bits have less probability of seeing the same channel. As such, in the receiver when the received data bits are de-interleaved for convolution decoding, if one received bit has low energy (bad bit) because of transmission in a fading channel, and an adjacent bit has high energy (good bit), the good bit can be used to recover the bad bit by convolution decoding.

With the conventional one column rotation interleaving, the adjacent data bits are spatially close and can face the same bad transmission channel. In a case where there are several continuous bits that face the same bad channel, it is difficult for the receiver to recover the bits by convolution decoding. However, with multiple column rotation in the improved interleaving process, adjacent bits are spatially separated such that they are less likely to be transmitted in the same bad/fading channel. As such, if a bit is transmitted in a bad channel, and the adjacent bits are transmitted via good channels, decoding in the receiver can still recover the bit transmitted via the bad channel using the bits transmitted in the good channels.

Improved Interleaver/Deinterleaver

According to the present invention, an embodiment of a further improved interleaving process is implemented in the example interleavers 108A, 108B of FIG. 1A, to further separate adjacent bits into different sub-band and different spatial stream, wherein in addition to larger column rotations (e.g., $N_{column}/N_{ss}$) one or more additional row rotations on different spatial streams are performed (row cyclic rotation is the same operation as in column cyclic rotation except the operation is on the rows instead of columns).

In one example of the further improved interleaving process according to an embodiment of the present invention, such is accomplished by modifying relation (2) above into interleaving relation (10) below for the interleavers 108A, 108B, as:

$$i = N_{row} * (((k \bmod N_{col}) + \text{floor}(N_{col}/N_{ss}) * i_{ss}) \bmod N_{col}) + (\text{floor}(k/N_{col}) + \text{ceil}(N/N_{ss} * i_{ss}) * N_{BPSC}) \bmod N_{row} \quad (10)$$

where k=0, 1, ... $N_{CBPS}$−1, $i_{ss}$=0 ... $N_{ss}$−1 where $N_{ss}$ is the number of spatial data streams, and i is the index of the bits after the block interleaving, and N=3 for 20 MHz channel and N=6 for 40 MHz channel which are the corresponding numbers 3 and 6 in Table 1.

Relation (10) above provides a mathematical expression of both column and row rotation. The number of row rotations changes according to different number of data streams and also with the transmission bandwidth.

Accordingly, the corresponding deinterleaving relation for the deinterleavers 118A, 118B in the example receiver 102, is modified into relation (11) below, as:

$$k = (N_{col} * (i \bmod N_{row}) + (\text{floor}(i/N_{row}) - \text{floor}(N_{col}/N_{ss}) * i_{ss}) \bmod N_{col} + N_{col} * (N - \text{ceil}(N/N_{ss} * i_{ss})) * N_{BPSC}) \bmod N_{CBPS}, \quad (11)$$

wherein i=0, 1, ... $N_{CBPS}$−1, $i_{ss}$=0 ... $N_{ss}$−1, where $N_{ss}$ is the number of spatial data streams, and N=3 for 20 MHz channel and N=6 for 40 MHz channel which are the corresponding numbers 3 and 6 in Table 1.

For example, in 20 MHz channelization case, the block size of the interleaver is 3*$N_{BPSC}$ rows and 16 columns. In one example, for a two data stream case, the interleaver for the first data stream can be the same as IEEE 802.11a interleaver. However, for the second data stream, after the bits are written in the block row-by-row, a 16/2=8 column cyclic rotation is performed. In the column rotation operation, the $9^{th}$ column is shifted to the $1^{st}$ column of the block and the $10^{th}$ column to the $2^{nd}$ column and so on. After the column rotation, a 2*$N_{BPSC}$ row cyclic rotation is performed.

A simple example of BPSK case where $N_{BPSC}$=1 is described below. In the row rotation operation, the $3^{rd}$ row is rotated to the first row where the $1^{st}$ and $2^{nd}$ rows are rotated to $2^{nd}$ and $3^{rd}$ row, respectively. The following example Tables 2(a)-(c) show the bits position for a BPSK modulation OFDM symbol in the interleaver block before and after the interleaving operation:

TABLE 2(a)

bit position in the interleaver block before the interleaving

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| 17 | 18 | 19 | 20 | 21 | 22 | 23 | 24 | 25 | 26 | 27 | 28 | 29 | 30 | 31 | 32 |
| 33 | 34 | 35 | 36 | 37 | 38 | 39 | 40 | 41 | 42 | 43 | 44 | 45 | 46 | 47 | 48 |

TABLE 2(b)

bit position in the interleaver block after the column rotation operation

| 9 | 10 | 11 | 12 | 13 | 14 | 15 | 16 | 1 | 2 | 3 | 4 | 5 | 6 | 7 | 8 |
|---|----|----|----|----|----|----|----|---|---|---|---|---|---|---|---|
| 25 | 26 | 27 | 28 | 29 | 30 | 31 | 32 | 17 | 18 | 19 | 20 | 21 | 22 | 23 | 24 |
| 41 | 42 | 43 | 44 | 45 | 46 | 47 | 48 | 33 | 34 | 35 | 36 | 37 | 38 | 39 | 40 |

TABLE 2(c)

bit position in the interleaver block after the row rotation operation

| 41 | 42 | 43 | 44 | 45 | 46 | 47 | 48 | 33 | 34 | 35 | 36 | 37 | 38 | 39 | 40 |
|----|----|----|----|----|----|----|----|----|----|----|----|----|----|----|----|
| 9 | 10 | 11 | 12 | 13 | 14 | 15 | 16 | 1 | 2 | 3 | 4 | 5 | 6 | 7 | 8 |
| 25 | 26 | 27 | 28 | 29 | 30 | 31 | 32 | 17 | 18 | 19 | 20 | 21 | 22 | 23 | 24 |

The bits are read out column-wise to obtain the block interleaver output.

Although the principle of the interleaver operation has been illustrated by example in stepwise operation, the operation can be implemented in one step.

Figure 1B:
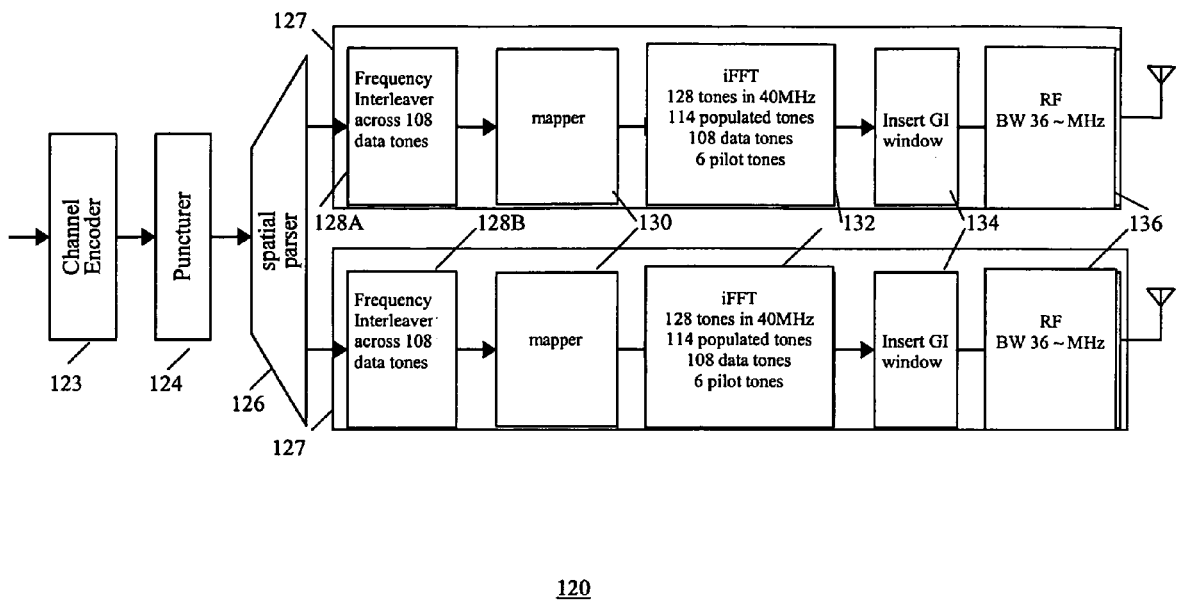
FIG. 1B shows a functional block diagram of an embodiment of an OFDM MIMO transmitter having a transmitter data path for 2-antenna MIMO in a 40 MHz channel, according to the present invention.

FIG. 1B shows a functional block diagram of an embodiment of an OFDM MIMO transmitter 120 having a transmitter data path for 2-antenna MIMO in a 40 MHz channel, according to the present invention. The transmitter 120 comprises a channel encoder 123, a puncturer 124, a spatial parser 126, and two data stream processing paths 127. Each data stream processing path 127 comprises an interleaver (e.g., interleaver 128A for a first processing path, and interleaver 128B for a second processing path), a constellation mapper 130, an IFFT function 132, and guard-band insertion window 134 and an RF modulator 136. For the parser 126 and the interleavers 128A, 128B portions of the transmitter, coded and punctured bits are interleaved across spatial streams and frequency tones. The interleavers 128A and 128B implement an embodiment of said further improved interleaving process according to the present invention as described herein.

Figure 2:
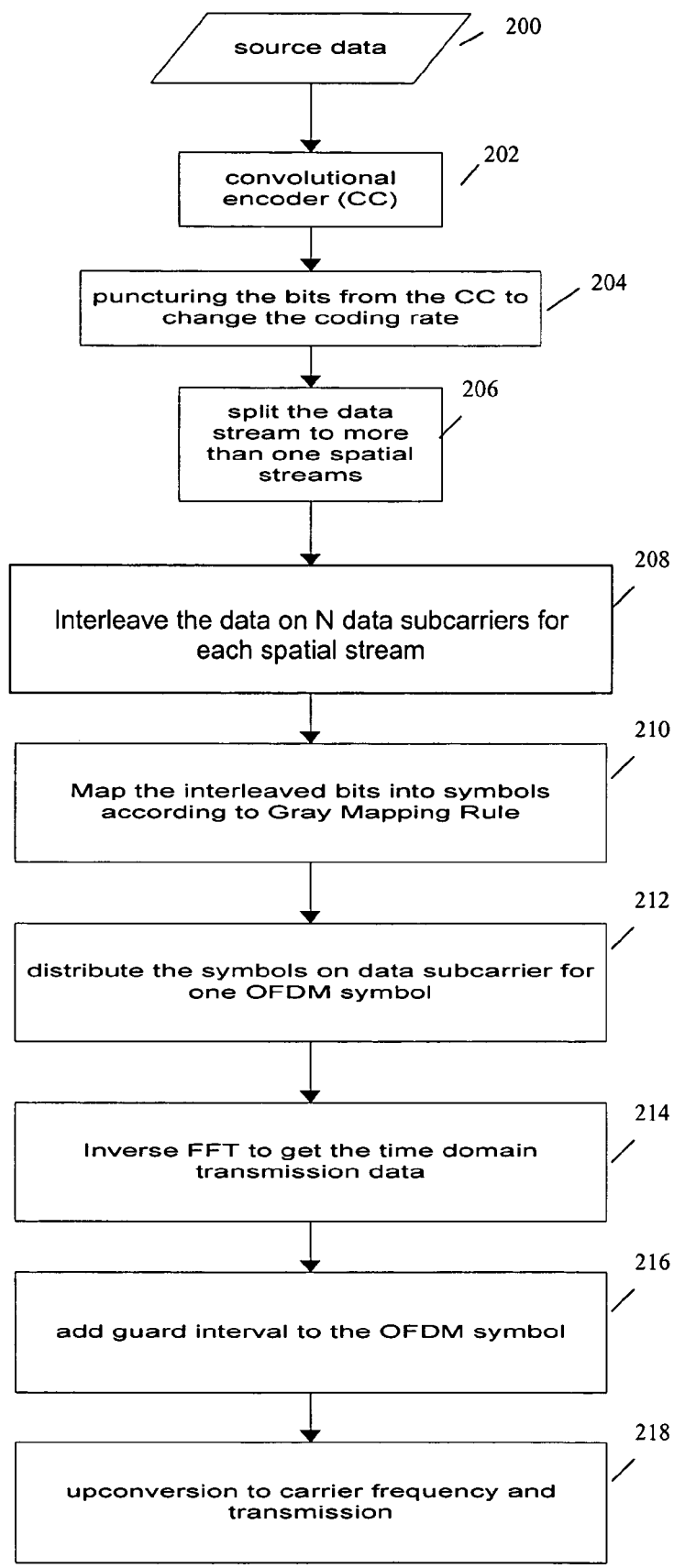
FIG. 2 shows a flowchart of the steps of an embodiment of an interleaving process in a MIMO transmitter according to the present invention.

FIG. 2 shows a flowchart of the steps of example operation of the transmitter 101 of FIG. 1A (or transmitter of FIG. 1B) according to an embodiment of said further improved interleaving process provided by the present invention. According to the example in FIG. 2, the transmitter 101 of FIG. 1A operates according to the steps of: source bit stream is received (step 200); the channel encoder 103 encodes data using convolutional encoding (CC) (step 202); the puncturer 104 punctures the bits from the CC to change the coding rate (step 204); the spatial parser 106 separates the data stream into several spatial streams (step 206); then in each processing path 107, an interleaver (e.g., 108A, 108B) interleaves the bits using multiple column rotations and one or more row rotations on different spatial streams are performed (i.e., for different spatial streams different rotations are used e.g. interleave the data across 48 data subcarriers for 20 MHz channel, interleave the data across 108 data subcarriers for 40 MHz channel, etc.) (step 208); the constellation mapper 110 groups/maps the interleaved bits into symbols using a Gray Mapping Rule (e.g., BPSK groups 1 bit into one symbol; 64 QAM groups 6 bits into one symbol, etc.) (step 210); the symbols are distributed on data subcarrier of one OFDM symbol by an IFFT operation wherein the data symbols are mapped onto each subcarrier for IFFT (step 212); the IFFT function 112 converts the frequency domain data to time domain transmission data (step 214); the guard window 114 adds guard interval to each OFDM symbol in time domain, to prevent inter symbol interference (step 216); and in the RF modulator 116 the signal is RF modulated and transmitted through the strongest channel via antennas 117 (step 218).

Figure 3:
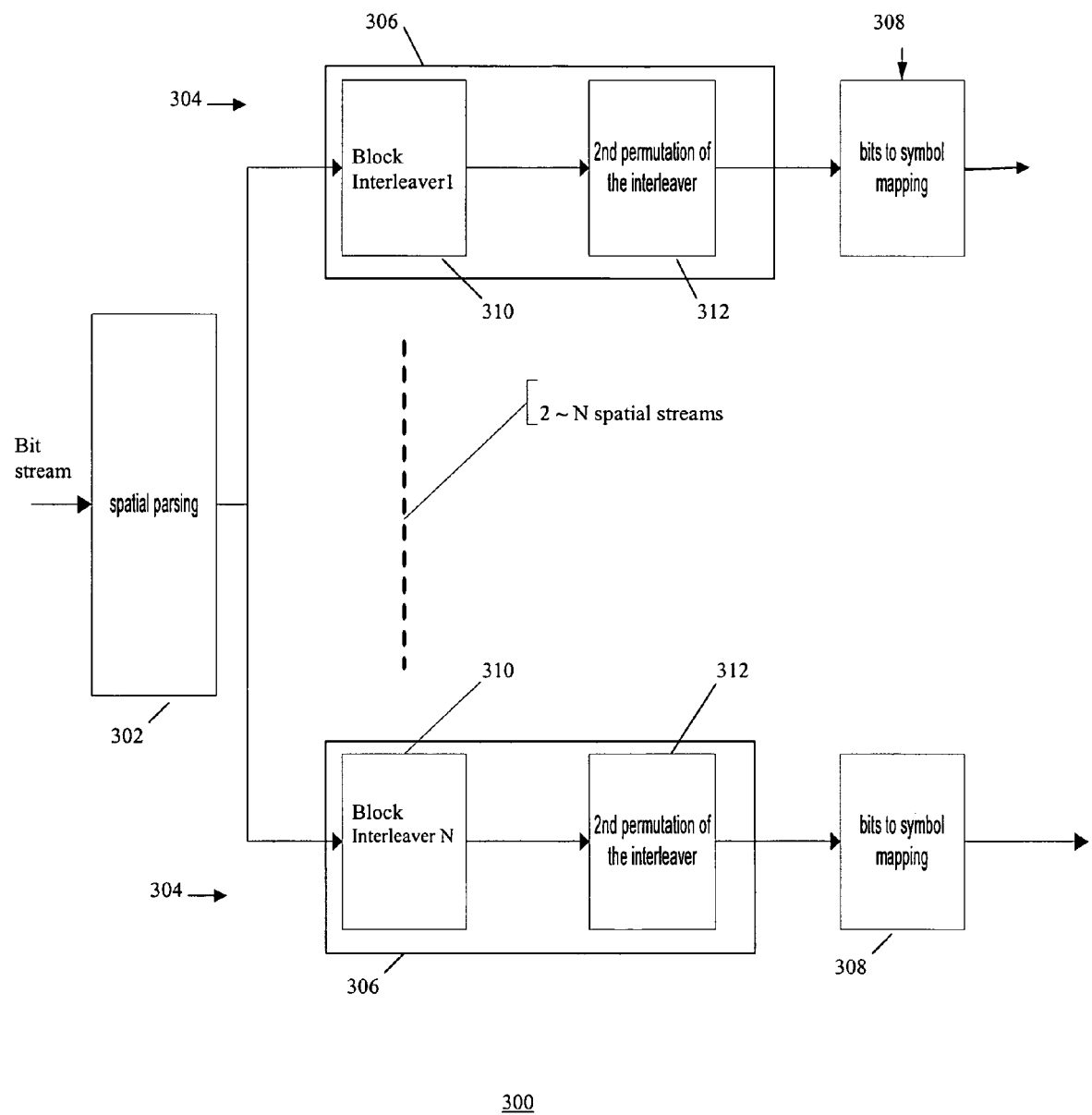
FIG. 3 shows a functional block diagram of example interleavers according to another embodiment of the present invention.

FIG. 3 shows a more detailed block diagram of a transmitter 300 utilizing an interleaving process for multiple spatial stream paths, according to another embodiment of the present invention. The transmitter 300 includes a spatial parser 302, and multiple spatial stream processing paths 304. Each path 304 includes an interleaver 306 and a bit to symbol mapper 308. Each interleaver comprises a block (first permutation) interleaver 310, Block Interleaver1 and Block Interleaver2, respectively, and a second permutation interleaver 312. The Block Interleaver1 and Block Interleave2 are implemented differently by different column rotation and at least one row rotation.

After spatial parsing of the input bit stream into multiple spatial streams by the parser 302, each spatial stream is processed in a corresponding spatial stream processing path 304. Then, the bits processed in each spatial stream path 304 are transmitted via a channel (e.g., as in system 100 of FIG. 1A).

As noted, in the example of FIG. 3, the interleaver 308 in each spatial stream path comprises a block (first permutation) interleaver 310 and a second permutation interleaver 312. The block interleavers 310 are configured according to the present invention (e.g., relation (10) above), such that each spatial stream is transmitted after multiple column rotations and multiple row rotations, wherein the number of column rotations is the number of columns in the interleaver array divided by the number of spatial streams (described above). The number of row rotations between adjacent data stream is always $N_{BPSC}$. In an example 4 data stream BPSK MIMO system, the row index for the four data streams are:

Data stream 0: 1 2 3

Data stream 1: 3 1 2

Data stream 2: 2 3 1

Data stream 3: 1 2 3

The column rotation for each spatial stream is different from other spatial streams. Further, the row rotation is different for different streams as illustrated above.

Figure 4:
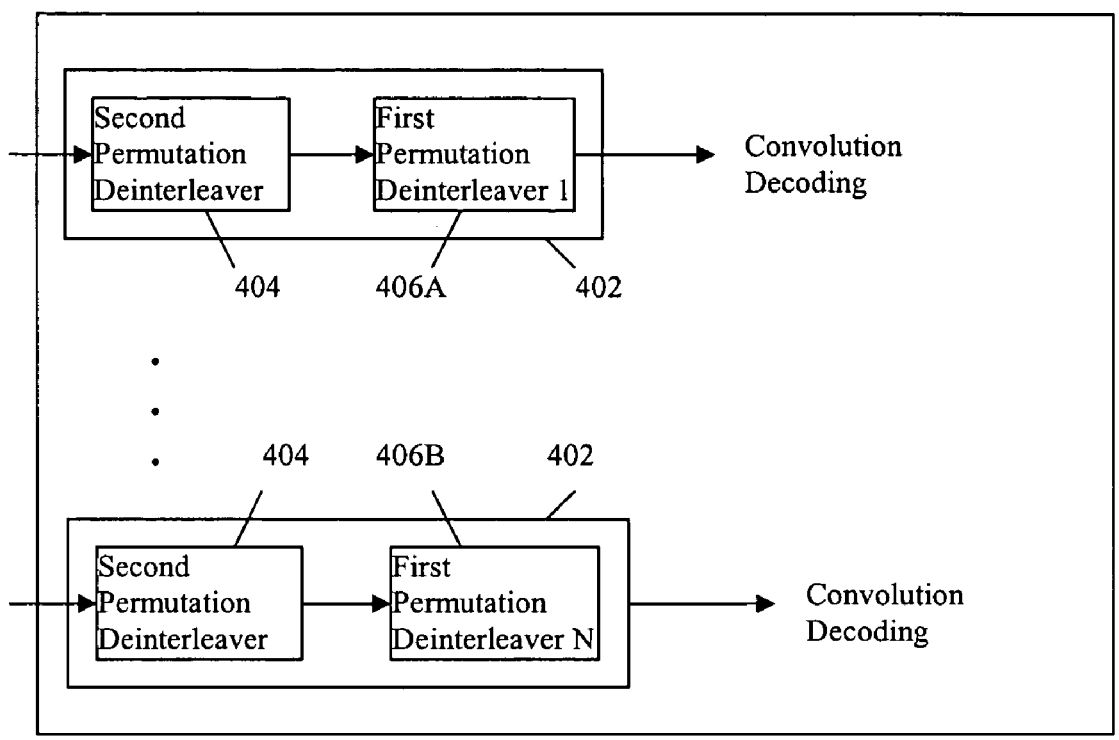
FIG. 4 shows a functional block diagram of an embodiment of an OFDM MIMO receiver including deinterleavers according to the present invention.

Referring to FIG. 4, an example receiver 400 performs the reverse operation, wherein the receiver 400 includes a de-interleaver 402 for each spatial stream for de-interleaving the received bits of each spatial stream according to the present invention. Each deinterleaver 402 comprises a second permutation deinterleaver 404 implementing relation (5) above and first permutation deinterleaver 406A, 406B (e.g., implementing relation (11) above).

Example simulations have verified the performance gains of the further improved interleaving process according to the present invention in 20 MHz MIMO channelizations. The coding and modulation schemes (MCS) for the example simulations are listed in Table 3.

TABLE 3

| | MCS definition in simulation | |
| Number of spatial streams | Modulation | Coding rate |
| --- | --- | --- |
| 2 | 64-QAM | 2/3 |
| 2 | 64-QAM | 3/4 |
| 2 | 64-QAM | 5/6 |
| 2 | 64-QAM | 7/8 |

Figure 5A:
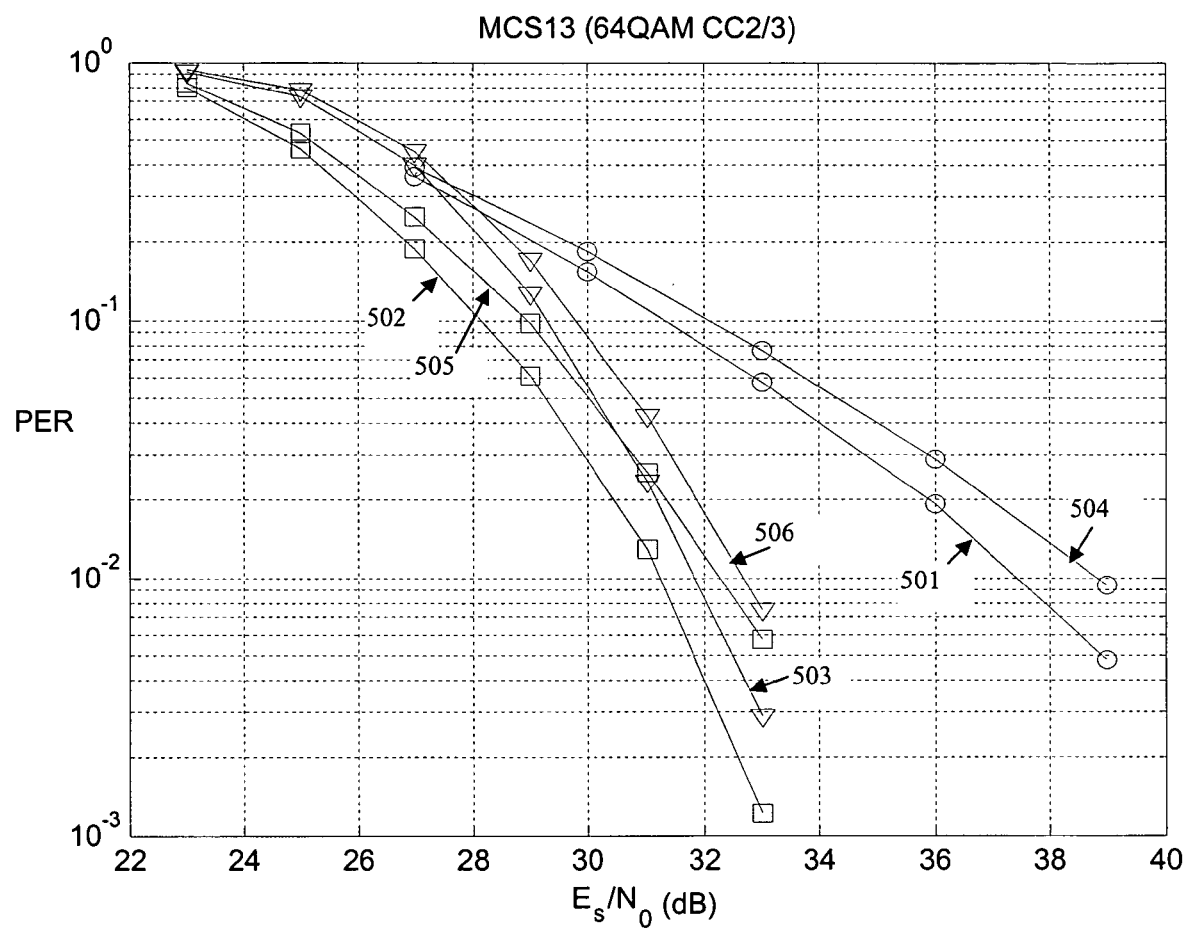
FIGS. 5A-D show example simulation results in 20 MHz channels.
Figure 5B:
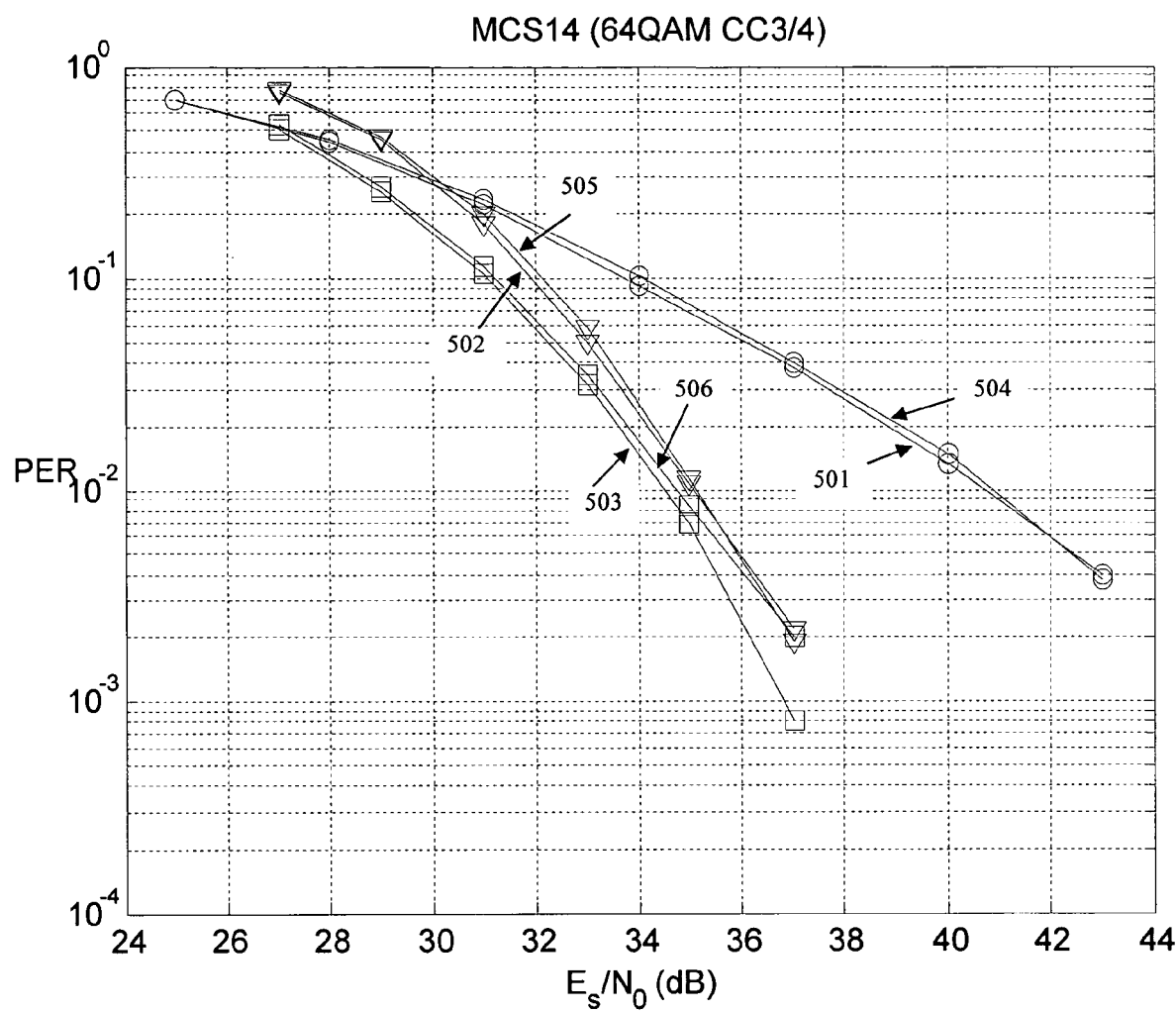
Figure 5C:
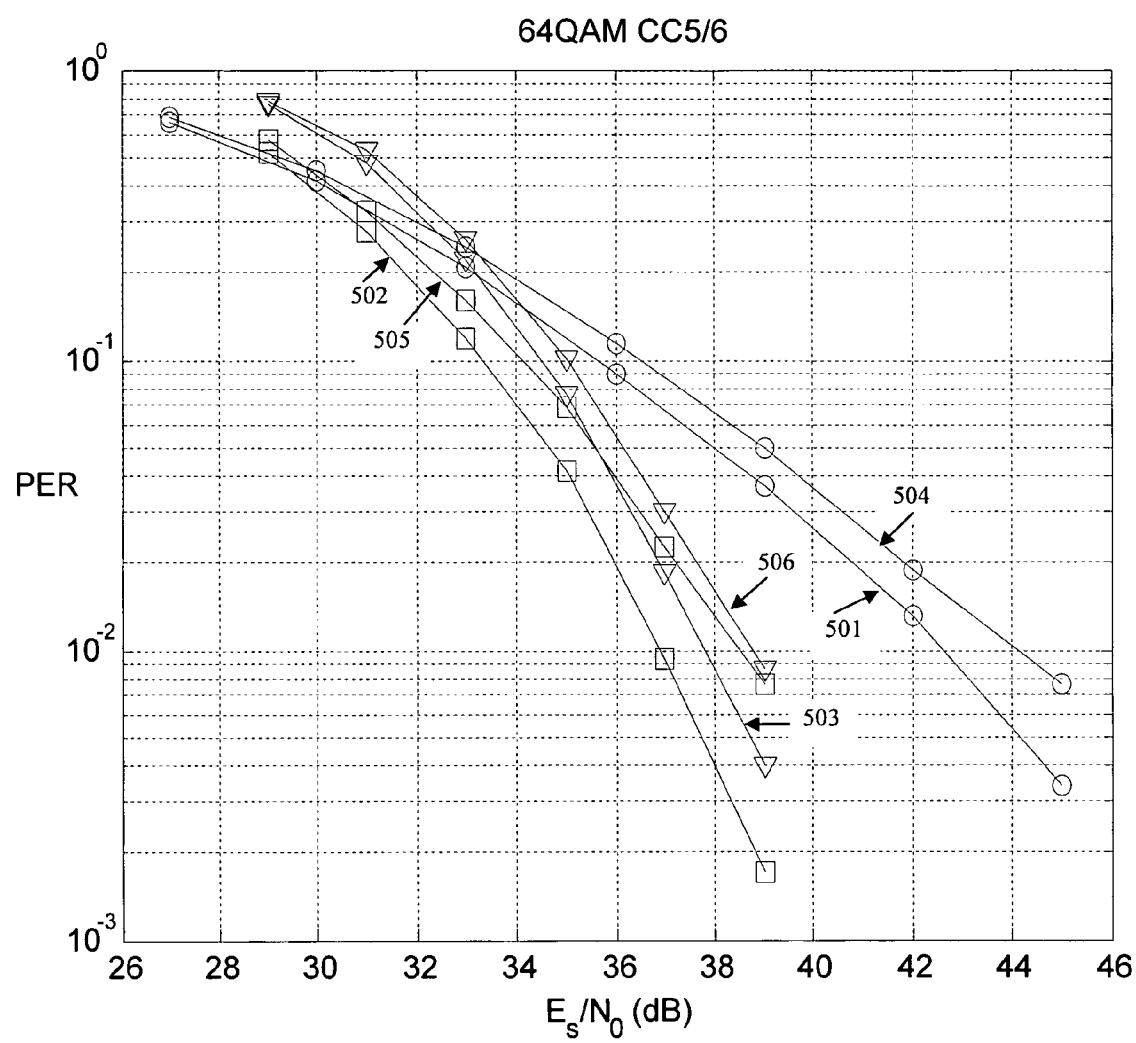
Figure 5D:
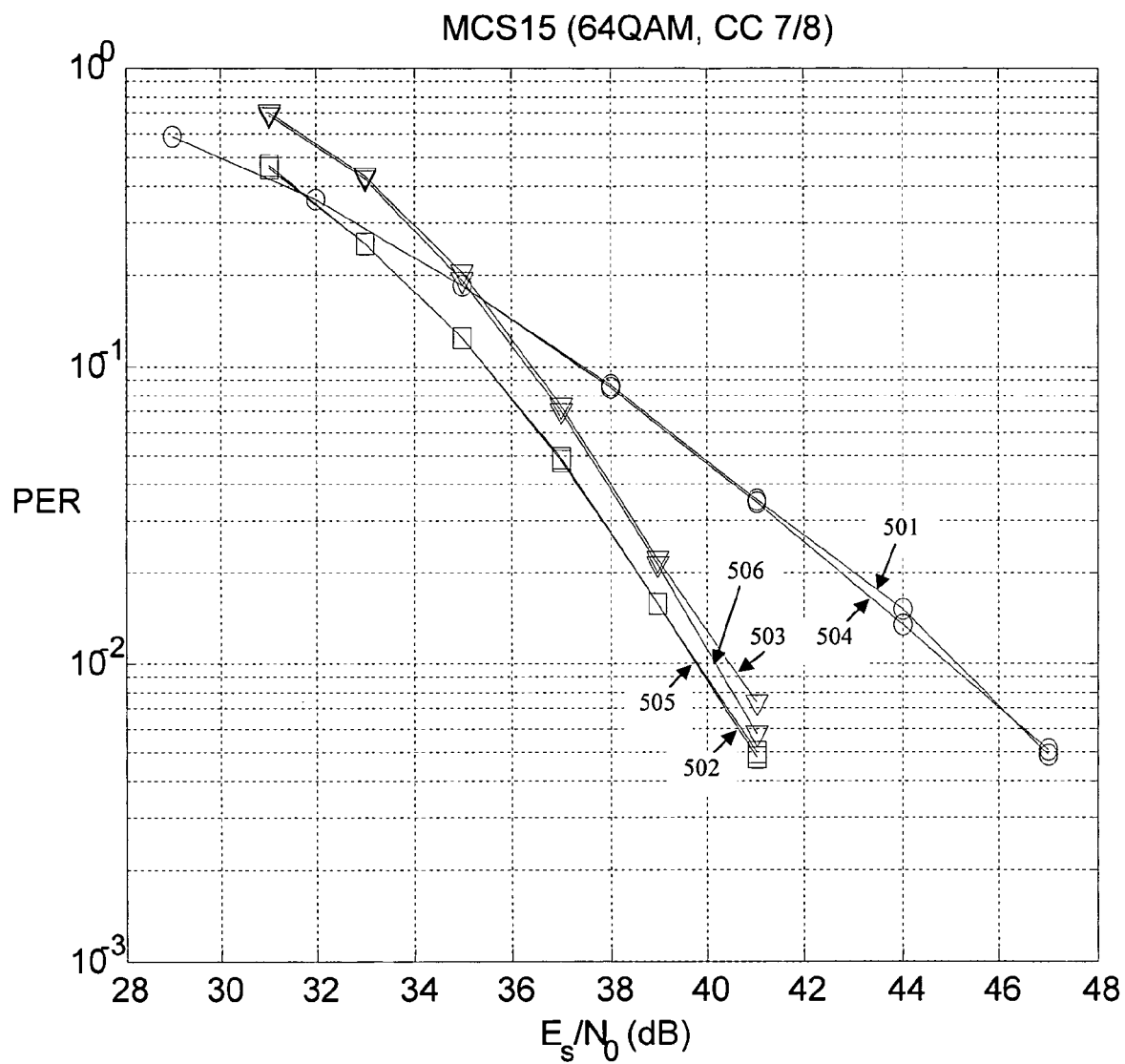

FIGS. 5A-D show example simulation results for IEEE 802.11n channel models BLOS, DLOS, ELOS and DNLOS for the above listed modulation and coding combination. FIG. 5A shows performance for the set MCS13 (64 QAM CC2/3), FIG. 5B shows performance for the set MCS14 (64 QAM CC3/4), FIG. 5C shows performance for 64 QAM CC5/6, and FIG. 5D shows performance for the set MCS15 (64 QAM CC7/8). In each of FIGS. 5A-D, example graphs 501, 502 and 503 show improved system performance according to the present invention for channels B, D and E, respectively, compared to graphs 504, 505 and 506 which show corresponding performance of the prior art systems for channels B, D and E, respectively. For sake of simplicity of example, perfect synchronization, no RF impairment, and perfect channel estimation is assumed. Further, an MMSE detector is utilized for data stream separation.

Various simulation results show that the further improved example interleaver according to the present invention performs 1.5 to 2 dB gain over the conventional interleavers in 64 QAM CC 2/3 and 64QAM CC 5/6 modes as listed in Table 3. The main performance improvement factors are the larger column rotation and the row rotation.

Figure 6:
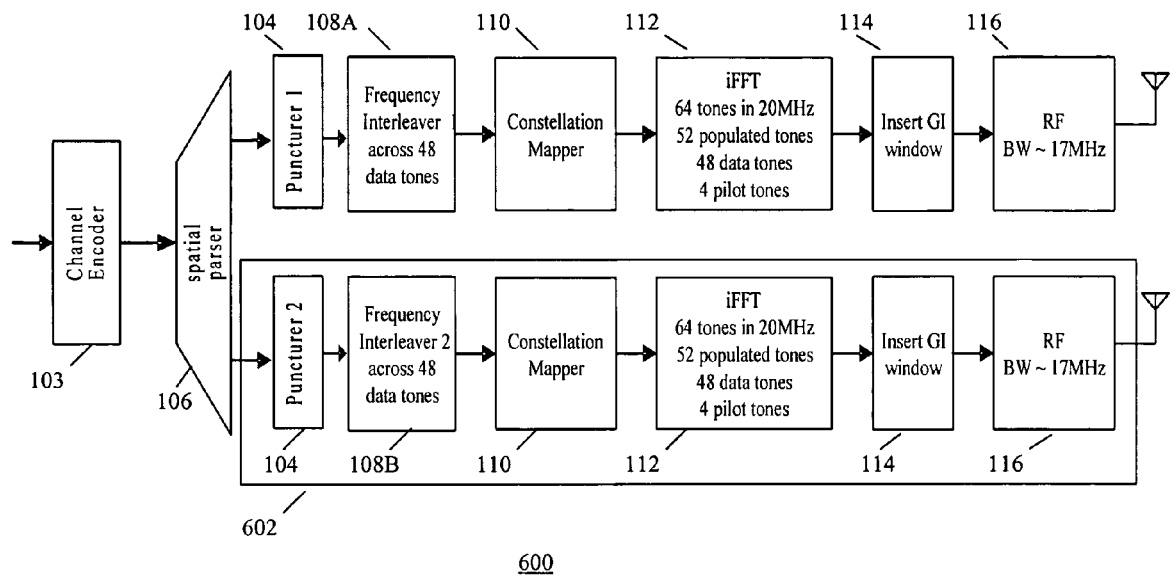
FIG. 6 shows a functional block diagram of an embodiment of an OFDM MIMO transmitter according to another embodiment of the present invention.

An improved interleaving process according to the present invention can be implemented in a modified OFDM MIMO transmitter architecture 600 for a 20 MHz channel is shown in FIG. 6, according to another embodiment of the present invention. Compared to FIG. 1A, in the modified transmitter architecture of FIG. 6, the puncturing processing is performed after the parsing processing. In this case, two puncturers are utilized, one puncturer per data stream processing path. With this modified structure, a MIMO system can transmit data streams with different coding rates simultaneously.

The transmitter 600 includes a channel encoder 103, a spatial parser 106, and two data stream processing paths 602. Each data stream processing path 602 includes a puncturer 104, an interleaver (e.g., interleavers 108A and 108B), a constellation mapper 110, an IFFT function 112, and guard-interval insertion window 114 and an RF modulator 116. For the parser 106 and the interleaver 108A/108B portions of the transmitter, coded and punctured bits are interleaved across spatial streams and frequency tones.

As shown, in the transmitter 600, each spatial data stream path includes a puncturer 104, allowing different transmission rates for the two spatial streams (based on the channel conditions). In one example, one puncturer 104 provides a convolutional code 1/2 for a first data stream, and the other puncturer 104 provides a convolution code 3/4 for the second data stream. Using multiple puncturers 104 provides more flexibility. For example, where there are two transmitter antennas, if the first antenna provides a better channel than the second antenna, then on the first antenna a high transmission data rate can be achieved, and on the second antenna a somewhat lower data transmission rate is achieved. This combination makes a MIMO OFDM system according to the present invention more flexible and essentially allows optimization of the transmission.

As those skilled in the art will recognize, the example transmitter in FIG. 1B can be similarly modified such that the puncturing processing is performed after the parsing processing, wherein two puncturers are utilized (one puncturer per data stream processing path), much the same way as shown in FIG. 6 and described above.

As those skilled in the art will recognize, other implementations of the present invention are possible, and the present invention is not limited to the example number of frequency rotations (column and row rotations) described above. The selected set of parameters is chosen based on the specific number of subcarriers in the 802.11n system. In other systems with different number of subcarriers and parsers, the principles of the present invention can be used while the specific rotation parameters can be different.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of data communication in a wireless system, comprising:
    parsing a bit stream into multiple spatial data streams;
    interleaving the bits in each spatial data stream by performing multiple column rotations and at least one row rotation, to increase diversity of the wireless system; and
    transmitting the bits of each spatial data stream, wherein the interleaving the bits in each spatial data stream includes performing a first interleaving permutation to ensure that adjacent coded bits are mapped onto nonadjacent subcarriers in one data stream for transmission, the first interleaving permutation varying on different spatial data streams by performing the different multiple column rotations and the at least one row rotation, to increase diversity of the wireless system, and wherein each spatial data stream interleaver array includes $N_{row}$ rows and $N_{col}$ columns of bits, such that the number of row and column rotations for each spatial data stream is according to the relation:

$$i = N_{row}*(((k \bmod N_{col}) + \text{floor}(N_{col}/N_{ss})*i_{ss}) \bmod N_{col}) + (\text{floor}(k/N_{col}) + \text{ceil}(N/N_{ss}*i_{ss})*N_{BPSC}) \bmod N_{row}$$

where $k=0, 1, \ldots N_{CBPS}-1$,
    $i_{ss}=0 \ldots N-1$ where $N_{ss}$ is the number of spatial data streams,
    $N_{BPSC}$ is the number of coded bits per subcarrier,
    $N_{CBPS}$ is the number of coded bits in a single OFDM symbol,
    i is the index of the bits after the block interleaving,
    k is the index of the coded bit before the first interleaving permutation,
    $N_{ss}$ is the number of spatial data streams and $i_{ss}$ is the index of spatial data stream, and
    N=3 for 20 MHz channel and N=6 for 40 MHz channel.

2. The method of claim 1 wherein the interleaving the bits in each spatial data stream further includes performing multiple column rotations to the largest possible distance within an interleaving array of that spatial data stream, to increase diversity of the wireless system.

3. The method of claim 1 wherein the number of column rotations for each spatial data stream is a function of the number of the total spatial data streams.

4. The method of claim 1 wherein the first interleaving permutation further includes determining the index i of a coded bit, according to the relation:

$$i = N_{row}*(((k \bmod N_{col}) + \text{floor}(N_{col}/N_{ss})*i_{ss}) \bmod N_{col}) + (\text{floor}(k/N_{col}) + \text{ceil}(N/N_{ss}*i_{ss})*N_{BSPC}) \bmod N_{row},$$

where $k=0, 1, \ldots N_{CBPS}-1$, is the index of the coded bit before the first permutation, and $i_{ss}=0 \ldots N_{ss}-1$ where $N_{ss}$ is the number of spatial data streams, $N_{BPSC}$ is the number of coded bits per subcarrier, and N=3 for 20 MHz channel and N=6 for 40 MHz channel.

5. The method of claim 1 further including receiving the transmitted bits of each spatial bit stream, and deinterleaving the received bits to determine the index k of the coded bit after a second deinterleaving permutation:

$$k = (N_{col}*(i \bmod N_{row}) + (\text{floor}(i/N_{row}) - \text{floor}(N_{col}/N_{ss})*i_{ss}) \bmod N_{col} + N_{col}*(N - \text{ceil}(N/N_{ss}*i_{ss}))*N_{BPSC}) \bmod N_{CBPS},$$

wherein $i=0, 1, \ldots N_{CBPS}-1$,
$i_{ss}=0 \ldots N_{ss}-1$, i is the index of a coded bit after the first deinterleaving permutation, and before the second deinterleaving permutation, $N_{ss}$ is the number of spatial data streams, $N_{CBPS}$ is the number of coded bits in a single OFDM symbol, and N=3 for 20 MHz channel and N=6 for 40 MHz channel.

6. The method of claim 1 wherein the wireless system comprises a MIMO system.

7. The method of claim 6 wherein the wireless system comprises an OFDM MIMO system.

8. The method of claim 1 wherein the parsing the bit stream further includes bitwise or group-wise round robin parsing to increase spatial diversity.

9. The method of claim 8 wherein the parsing the bit stream further includes bitwise round robin parsing such that one bit of the bit stream is parsed to one data stream each time.

10. The method of claim 1 further including puncturing each spatial data stream after the step of parsing.

11. The method of claim 10 wherein the puncturing for each spatial data stream is based on the channel condition.

12. A wireless communication system, comprising:
a transmitter including:
  a parser that parses a bit stream into multiple spatial data streams;
  multiple interleavers corresponding to the multiple spatial data streams, wherein each interleaver interleaves the bits in the corresponding spatial data stream by performing column rotations and at least one row rotation, to increase diversity of the wireless system; and
  a modulator that transmits the bits of each spatial data stream; and
a receiver that receives and deinterleaves the transmitted bits, wherein each interleaver includes a first permutation interleaver that ensures that adjacent coded bits are mapped onto nonadjacent subcarriers in one data stream for transmission, the first interleaving permutation varying on different spatial data streams by performing the different multiple column rotations and the at least one row rotation, to increase diversity of the wireless system, and wherein the first permutation interleaver further determines the index i of a coded bit after the first permutation, and before the second permutation, according to the relation:

$$i = N_{row} * (((k \bmod N_{col}) + \text{floor}(N_{col}/N_{ss}) * i_{ss}) \bmod N_{col}) + (\text{floor}(k/N_{col}) + \text{ceil}(N/N_{ss} * i_{ss})) * N_{BPSC}) \bmod N_{row}$$

where $k=0, 1, \ldots N_{CBPS}-1$, is the index of the coded bit before the first permutation, and $i_{ss}=0 \ldots N_{ss}-1$ where $N_{ss}$ is the number of spatial data streams, and $N_{BPSC}$ is the number of coded bits per subcarrier, $N_{CBPS}$ is the number of coded bits in a single OFDM symbol, each spatial data stream interleaver array includes $N_{row}$ rows and $N_{col}$ columns of bits, and N=3 for 20 MHz channel and N=6 for 40 MHz channel.

13. The system of claim 12 wherein each interleaver performs multiple column rotations to the largest possible distance within an interleaving array of the corresponding spatial data stream, to increase diversity of the wireless system.

14. The system of claim 12 wherein the number of row rotations for each spatial data stream is a function of the index and the number of the spatial data streams.

15. The system of claim 14 wherein the number of column rotations for each spatial data stream is a function of the number of the spatial data streams and the number of bit columns in the interleaver array.

16. The system of claim 15 wherein each spatial data stream interleaver array includes $N_{row}$ rows and $N_{column}$ columns of bits, such that the number of row and column rotations for each spatial data stream is according to the relation:

$$i = N_{row} * (((k \bmod N_{col}) + \text{floor}(N_{col}/N_{ss}) * i_{ss}) \bmod N_{col}) + (\text{floor}(k/N_{col}) + \text{ceil}(N/N_{ss} * i_{ss})) * N_{BSPC}) \bmod N_{row},$$

where $k=0, 1, \ldots N_{CBPS}-1$,
$i_{ss}=0 \ldots N_{ss}-1$ where $N_{ss}$ is the number of spatial data streams,
i is the index of the bits after the block interleaving,
$N_{ss}$ is the number of spatial data streams and $i_{ss}$ is the index of spatial data stream, and
N=3 for 20 MHz channel N=6 for 40 MHz channel.

17. The system of claim 12 wherein the receiver includes a plurality of deinterleavers such that each deinterleaver deinterleaves the bits in a received spatial data stream.

18. The system of claim 17 wherein each deinterleaver includes a first permutation deinterleaver and a second permutation deinterleaver, and the first permutation deinterleaver deinterleaves the received bits determine the index k of the coded bit after a second deinterleaving permutation according to the relation:

$$k = (N_{col} * (i \bmod N_{row}) + (\text{floor}(i/N_{row} - \text{floor}(N_{col}/N_{ss}) * iss) \bmod N_{col} + N_{col} * (N - \text{ceil}(N/N_{ss} * i_{ss})) * N_{BPSC}) \bmod N_{CBPS},$$

wherein $i=0, 1, \ldots N_{CBPS}-1$,
$i_{ss}=0 \ldots N_{ss}-1$, i is index of a coded bit after the first deinterleaving permutation, and before the second deinterleaving permutation, $N_{ss}$ is the number of spatial data streams, $N_{CBPS}$ is the number of coded bits in a single OFDM symbol.

19. The system of claim 12 wherein the wireless system comprises a MIMO system.

20. The system of claim 19 wherein the wireless system comprises an OFDM MIMO system.

21. The system of claim 12 wherein the parser parses the bit stream by bitwise round robin parsing, to increase spatial diversity.

22. The system of claim 21 wherein the parser parses the bit stream by bitwise round robin parsing such that one bit of the bit stream is parsed to one data stream each time.

23. The system of claim 12 wherein the parser parses the bit stream by group-wise round robin parsing, to increase spatial diversity wherein the group size equals the number of bits in one QAM symbol.

24. The system of claim 23 wherein the parser parses the bit stream by group-wise round robin parsing such that a group of bits having a size equal to the number of bits in one QAM symbol, in the bit stream is parsed to one data stream each time.

25. A method of data communication in a wireless system, comprising:
parsing a bit stream into multiple spatial data streams;
interleaving the bits in each spatial data stream by performing multiple column rotations and at least one row rotation, to increase diversity of the wireless system; and
transmitting the bits of each spatial data stream, wherein the interleaving the bits in each spatial data stream includes performing a first interleaving permutation to ensure that adjacent coded bits are mapped onto nonadjacent subcarriers in one data stream for transmission, the first interleaving permutation varying on different spatial data streams by performing the different multiple column rotations and the at least one row rotation, to increase diversity of the wireless system, and wherein the first interleaving permutation further includes determining the index i of a coded bit, according to the relation:

$$i = N_{row} * (((k \bmod N_{col}) + \text{floor}(N_{col}/N_{ss}) * i_{ss}) \bmod N_{col}) + (\text{floor}(k/N_{col}) + \text{ceil}(N/N_{ss} * i_{ss})) * N_{BPSC}) \bmod N_{row}$$

where $k=0, 1, \ldots N_{CBPS}-1$, is the index of the coded bit before the first permutation, and $i_{ss}=0 \ldots N_{ss}-1$ where $N_{ss}$ is the number of spatial data streams, and $N_{BPSC}$ is the number of coded bits per subcarrier, $N_{CBPS}$ is the number of coded bits in a single OFDM symbol, each spatial data stream interleaver array includes $N_{row}$ rows and $N_{col}$ columns of bits, and N=3 for 20 MHz channel and N=6 for 40 MHz channel.

26. A method of data communication in a wireless system, comprising:

parsing a bit stream into multiple spatial data streams;
interleaving the bits in each spatial data stream by performing multiple column rotations and at least one row rotation, to increase diversity of the wireless system; and
transmitting the bits of each spatial data stream, wherein the interleaving the bits in each spatial data stream includes performing a first interleaving permutation to ensure that adjacent coded bits are mapped onto nonadjacent subcarriers in one data stream for transmission, the first interleaving permutation varying on different spatial data streams by performing the different multiple column rotations and the at least one row rotation, to increase diversity of the wireless system; and
receiving the transmitted bits of each spatial bit stream, and deinterleaving the received bits to determine the index k of the coded bit after a second deinterleaving permutation:

$$k=(N_{col}*(i \bmod N_{row})+(\text{floor}(i/N_{row}-\text{floor}(N_{col}/N_{ss})*i_{ss})\bmod N_{col}+N_{col}*(N-\text{ceil}(N/N_{ss}*i_{ss}))*N_{BPSC}) \bmod N_{CBPS}$$

wherein $i=0, 1, \ldots N_{CBPS}-1$, $i_{ss}=0 \ldots N_{ss}-1$, i is the index of a coded bit after the first deinterleaving permutation, and before the second deinterleaving permutation, $N_{ss}$ is the number of spatial data streams and $i_{ss}$ is the index of spatial data stream, $N_{BPSC}$ is the number of coded bits per subcarrier, $N_{CBPS}$ is the number of coded bits in a single OFDM symbol, each spatial data stream interleaver array includes $N_{row}$ rows and $N_{col}$, columns of bits, and N=3 for 20 MHz channel and N=6 for 40 MHz channel.

27. A wireless communication system, comprising:
a transmitter including:
    a parser that parses a bit stream into multiple spatial data streams;
    multiple interleavers corresponding to the multiple spatial data streams,
    wherein each interleaver interleaves the bits in the corresponding spatial data stream by performing column rotations and at least one row rotation, to increase diversity of the wireless system, wherein each deinterleaver includes a first permutation deinterleaver and a second permutation deinterleaver, and the first permutation deinterleaver deinterleaves the received bits determine the index k of the coded bit after a second deinterleaving permutation according to the relation:

$$k=(N_{col}*(i \bmod N_{row})+(\text{floor}(i/N_{row}-\text{floor}(N_{col}/N_{ss})*i_{ss})\bmod N_{col}+N_{col}*(N-\text{ceil}(N/N_{ss}*i_{ss}))*N_{BPSC}) \bmod N_{CBPS}$$

wherein $i=0, 1, \ldots N_{CBPS}-1$, $i_{ss}=0 \ldots N-1$, i is the index of a coded bit after the first deinterleaving permutation, and before the second deinterleaving permutation, $N_{ss}$ is the number of spatial data streams and $i_{ss}$ is the index of spatial data stream, $N_{BPSC}$ is the number of coded bits per subcarrier, $N_{CBPS}$ is the number of coded bits in a single OFDM symbol, each spatial data stream interleaver array includes $N_{row}$ rows and $N_{col}$, columns of bits and N=3 for 20 MHz channel and N=6 for 40 MHz channel, a modulator that transmits the bits of each spatial data stream; and
a receiver that receives and deinterleaves the transmitted bits, wherein each interleaver includes a first permutation interleaver that ensures that adjacent coded bits are mapped onto nonadjacent subcarriers in one data stream for transmission, the first interleaving permutation varying on different spatial data streams by performing the different multiple column rotations and the at least one row rotation, to increase diversity of the wireless system, wherein the receiver includes a plurality of deinterleavers such that each deinterleaver deinterleaves the bits in a received spatial data stream.

* * * * *